United States Patent [19]
Traill et al.

[11] Patent Number: 6,078,567
[45] Date of Patent: Jun. 20, 2000

[54] ECHO CANCELLATION USING CROSS-CORRELATION OF BUFFERED RECEIVE AND TRANSMIT SAMPLE SEGMENTS TO DETERMINE CANCELLING FILTER COEFFICIENTS

[75] Inventors: Douglas M. Traill; Philip J. Sheppard, both of Ipswich; Jianxiong Bai, Nottingham, all of United Kingdom; Simon Milner, Sunnyvale, Calif.

[73] Assignee: British Telecommunications plc, London, United Kingdom

[21] Appl. No.: 08/836,352

[22] PCT Filed: Nov. 7, 1995

[86] PCT No.: PCT/GB95/02618

§ 371 Date: Jul. 2, 1997

§ 102(e) Date: Jul. 2, 1997

[87] PCT Pub. No.: WO96/15597

PCT Pub. Date: May 23, 1996

[30] Foreign Application Priority Data

Nov. 10, 1994 [EP] European Pat. Off. .............. 94308290
Nov. 10, 1994 [EP] European Pat. Off. .............. 94308291

[51] Int. Cl.⁷ ....................................................... H04B 1/52
[52] U.S. Cl. ........................... 370/289; 370/290; 379/410
[58] Field of Search ..................................... 370/286, 289, 370/290, 291; 379/406, 410, 411

[56] References Cited

U.S. PATENT DOCUMENTS

| 4,561,067 | 12/1985 | McKeown . |
| 5,309,474 | 5/1994 | Gilhousen et al. . |
| 5,323,459 | 6/1994 | Hirano . |
| 5,577,097 | 11/1996 | Meek ............................................ 379/3 |
| 5,684,792 | 11/1997 | Ishihara .................................. 370/32.1 |
| 5,737,410 | 4/1998 | Vahatalo et al. ......................... 379/410 |

FOREIGN PATENT DOCUMENTS

| 0 116 387 | 8/1984 | European Pat. Off. . |
| WO 93/05597 | 3/1993 | WIPO . |

*Primary Examiner*—Hassan Kizou
*Assistant Examiner*—Mitchell Slavitt
*Attorney, Agent, or Firm*—Nixon & Vanderhye P.C.

[57] ABSTRACT

An echo detecting system includes data stores for storing signals from up and down channels respectively. The signals undergo pre-processing to identify signals forms characteristic of speech and instruct a measurement unit to carry out comparison using cross-correlation techniques between the signals stored in the stores only when such characteristics are detected. This reduces the processing power required and raises the accuracy of the correlations. Parallel processing techniques allow echoes with longer delay periods to be detected. The results of the measurement may be used to generate an echo-cancellation signal.

21 Claims, 2 Drawing Sheets

ECHO CANCELLATION USING CROSS-CORRELATION OF BUFFERED RECEIVE AND TRANSMIT SAMPLE SEGMENTS TO DETERMINE CANCELLING FILTER COEFFICIENTS

BACKGROUND OF THE INVENTION

1. Field of the Invention

This invention relates to the measurement of signal quality over telecommunications links, and in particular to the detection of interference.

2. Related Art

More particularly, this invention relates to the detection of spurious signals generated on a second channel as a result of signals being transmitted on a first channel, a situation known generally as 'crosstalk'. The spurious signal, once detected, may be measured and cancelled.

The invention is particularly suited to detecting echo. This occurs in a two-way telecommunications link. A signal travelling in a first direction gives rise to a spurious signal travelling in the opposite direction. If this spurious signal returns to the original source of the signal, it will appear as an echo.

The echo effect may be caused in one of several ways. It may occur as a result of acoustical feedback between the earpiece and mouthpiece of a telephone. It may occur as a result of reflections caused by impedance mismatches. It may occur as a result of cross-coupling between the paths in 4-to-2 wire hybrid points; these are the points where the two-way traffic carried over the two-wire connection from a telephone termination is separated into two separate channels (a so-called four-wire connection). This invention is suitable for detecting echo effects at points in the system where signals in the two directions are carried over two separate channels.

The result of any such echo effect is that a speaker will receive his or her own speech, delayed by a short period. The magnitude of the delay is largely determined by the distance the signal has to travel, with a smaller contribution from signal processing delays. The distances travelled by signals in intercontinental calls can introduce delays readily detectable by human observers: the round trip distance over the earth's surface between one point on the earth's surface and its antipodes is 40000 km (approximately 140 light-milliseconds—since landlines do not necessarily follow the shortest route the practical distance is greater than this). The round trip distance between two points on the earth's surface via a geostationary satellite is approximately ½ light-second (150000 km). International call-diversion and other network services can create even longer paths.

Delays of this order of magnitude, as well as being annoying, also confuse the speaker who can find it impossible to continue speaking. It is therefore desirable to detect when echo is occurring so that remedial action can be taken. This remedial action may involve taking the faulty circuit out of use until it can be repaired, or limiting the use of the faulty circuit to uses where the echo causes less problems, such as short-distance calls (in which the echo delay is too short to be troublesome) or to one-way transmission such as facsimile transmissions. Methods also exist for cancelling the echo signal by combining it artificially with a complementary signal derived from the outgoing signal to generate a zero output. However, all these systems require prior knowledge that an echo exists, and something of its characteristics, notably its delay time and its attenuation.

It is known to transmit test signals over a telecommunications link in order to detect the presence of echoes. This system can only be used on lines which are not currently in use, because traffic on the line would interfere with the detection of the test signal echo. It is also Known to use trained human observers to monitor live conversations, but this method is labour-intensive, subject to human subjectivity, and also has implications for the privacy of the speakers.

In-service non-intrusive measurement systems are known which use least mean square (LMS) adaptive filter systems to measure the delay and echo strength from the conveyed impulse response. Modern digital signal processors can support about 650 filter coefficients: at a sampling rate of 8 kHz this equates to a maximum detectable echo path of about 80 ms. To detect longer echo paths using this impulse response technique either the number of filter coefficients must be increased beyond these practical limits, or the sampling rate must be reduced, which reduces the likelihood of a convergent response from any one sample.

U.S. Pat. No. 5,062,102 (Taguchi) discloses an echo canceller in which echo is detected by identifying cross-correlations between the signals carried by first and second transmission lines using a cross-correlation technique. This allows short samples of signals To be used, rather than the long passages required by an adaptive filter, and allows filter coefficients for echo correction signals to be generated more rapidly than by the use of adaptive filters.

SUMMARY OF THE INVENTION

According to a first aspect of the invention, an interference detection system for a telecommunications link having separate first and second channels, the system comprising first monitoring means for monitoring signals travelling over the first channel, second monitoring means for monitoring signals travelling over the second channel and comprising comparison means for comparing the signals monitored by the first and second monitoring means for one or more delay periods to identify the presence of interference between the channels, wherein the comparison means is arranged to identify cross-correlations between the signals monitored by the first and second monitoring means, is characterised in that the first monitoring means includes means for detecting and selecting signal segments on the first channel having predetermined characteristics and the comparison means is arranged to identify cross-correlations between such characteristic signal segments and the signals monitored by the second monitoring means, the selected signal segments having lengths corresponding to the duration of the predetermined characteristic.

According to a second aspect, a method of detecting interference between channels on a telecommunications link having first and second channels, the method comprising the steps of monitoring signals travelling over a first channel, monitoring signals travelling over a second channel, and comparing the signals for one or more delay periods to identify the presence of interference between the channels, wherein the method comprises the identification of cross-correlations between the signals carried by the first and second channels, is characterised by the further steps of detecting signals having predetermined characteristics on the first channel, selecting segments of signals having said characteristics, and identifying cross-correlations between such characteristic signal segments and the signals carried by the second channel, the selected signal segments having lengths corresponding to the duration of the predetermined characteristic.

By selecting such characteristic signals for analysis the processing capacity available can be used efficiently by concentrating an signal samples which are likely to produce strong cross-correlations, allowing a wider range of delays to be monitored for. False correlations from low-level white noise are also avoided.

In a preferred arrangement signal segments having such characteristics are detected on the first channel and selected for attempted correlation with the signals carried by the second channel, the selected signal segments having lengths corresponding to the duration of the predetermined characteristic, and preferably greater than a predetermined minimum. By tailoring the sample length to match the duration of the characteristic element, the chance of a correct correlation being made is improved, because the longer the sample the less likely a false correlation is made, without wastefully attempting to correlate parts of a signal not containing the characteristic elements.

The signal characteristics to be identified may include signal strength or may be characteristics associated with human speech. Because characteristic features of the signals are monitored and correlated, these features can also be used to determine other characteristics of the interference phenomenon.

In a preferred arrangement, the comparison means comprises a plurality of cross-correlation means, each cross-correlation means performing a cross-correlation for a different delay period, and delay measurement means for determining, from the outputs of the cross-correlation means, the magnitude of the delay in the interference signal.

The invention can be used for monitoring interference between any two channels of a communications system, but is particularly suited to echo detection provided that the send and receive paths are separated, e.g. conventional four-wire analogue telephony, digital telephony, broadband applications, duplex radio systems (time division or frequency division) or asynchronous transfer mode (ATM). Accordingly, the pair or pairs of channels of the communications system to which the intereference detection system is connected preferably each comprise a two-way communications link, the system being arranged to detect echo.

Embodiments of the invention allow a greater range of delay periods to be monitored simultaneously by storing several samples in separate stores and processing each separately. In a typical situation two different echo delay periods will be found, depending on which caller is speaking.

The system nay be used to provide input to an echo canceller. An echo canceller adds to the return path a cancellation signal corresponding to the signal on the outward path, having a delay and attenuation corresponding to that of the echo, but having opposite phase. One problem encountered with known echo cancellers is that a false correlation can cause a cancellation signal to be inserted where none is needed, which creates its own echo effect. The problem can be avoided by determining a rolling average from a predetermined number of measurements from the delay and/or attenuation measurement means, differing from each other by values less than a predetermined value. The effects of individual false correlations, which will have different attenuations and delays from the true echo, are therefore minimised.

In a network management system there may be a plurality of interference detection systems, each associated with a respective pair of channels, and one or more means for introducing a cancellation signal into a channel on which interference is detected. By arranging the system in this way the number of cancellers can be reduced, the cancellers being dynamically allocated to those channel pairs where interference, or the most serious interference, is detected.

The system may include a speech direction determination means comprising means for determining on which channel the longest segments of signal having the monitored characteristics occur. The characteristic features of the incoming signal can therefore be used to identify which of the two callers is speaking, and therefore which path should be monitored for echo signals, thus reducing the processing overhead by a further factor of two.

The length of the delay can be used to assist in locating the source of the echo, as longer delays are caused by equipment further away, or with more intermediate processing elements. Insofar as the call routing is known, a network operator can thereby identify the faulty apparatus. Of course, in some cases the call may be an interconnection between two operators, and one operator may not know the routing in the other operator's network. In this case, a network operator using the echo detection system of the invention can nevertheless identify from the length of the echo delay whether the echo is caused by his own network or the other one, and thus whether remedial action is within his power.

BRIEF DESCRIPTION OF THE DRAWINGS

An embodiment of the invention will now be described by way of example only, with reference to the drawings, in which.

DETAILED DESCRIPTION OF EXEMPLARY EMBODIMENTS

Figure 1:
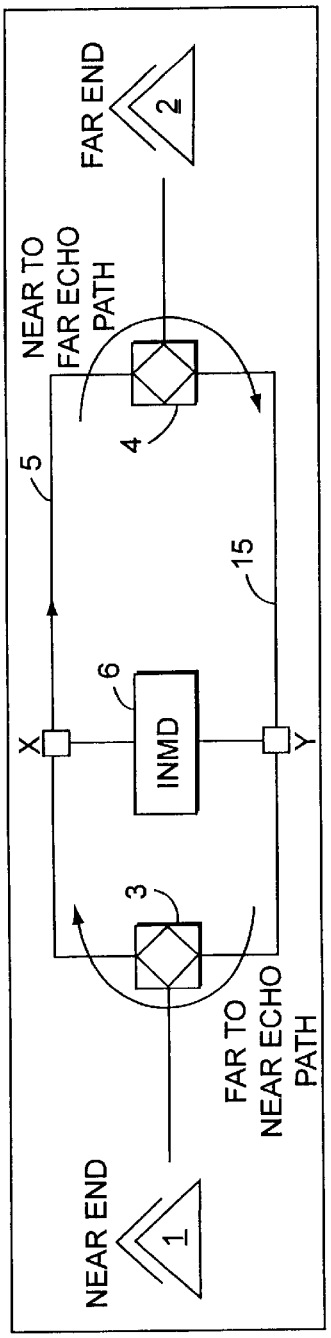
FIG. 1 illustrates a simple telephone network including an echo detector according to the invention.
Figure 2:
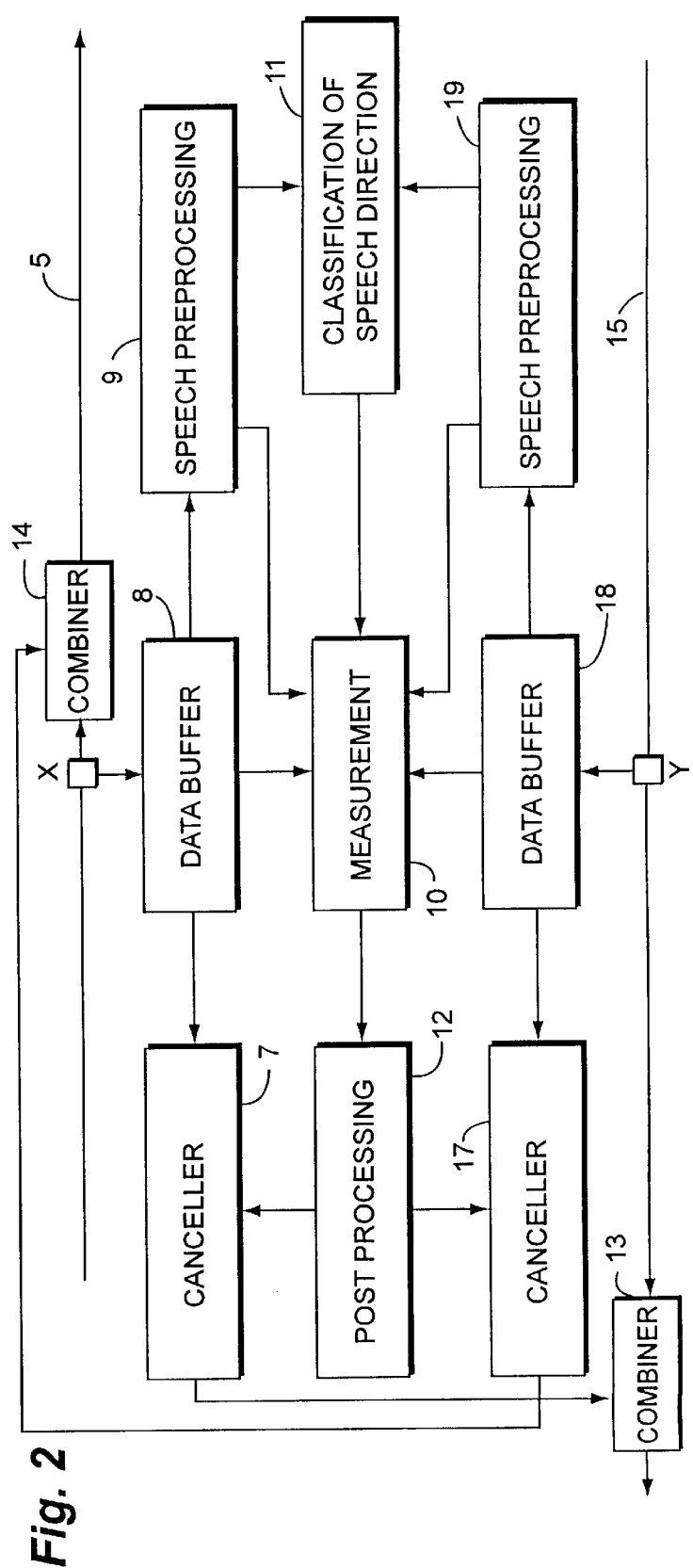
FIG. 2 shows the various elements of one embodiment of the echo detector of FIG. 1, incorporating an echo canceller.

FIG. 1 shows a simplified telephone network having two terminations 1 and 2 connected through respective 4-to-2 wire hybrids 3, 4 to a telephone trunk link having a first path 5, (from hybrid 3 to hybrid 4) and a second path 15 in the reverse direction. Connected at some point along the paths 5 and 15 is a non-intrusive measuring device 6 which is described in more detail below. The device 6 is connected to the first path 5 at point X and to the second path 15 at point Y. FIG. 2 shows the echo-detector of FIG. 1 in more detail. From the tap points X, Y on the paths 5, 15 respectively signals are fed to respective buffers 8, 18, and hence to respective pre-processing units 9, 19. The pre-processing units 9, 19 feed a speech direction classification unit 11. A measurement unit 10 receives inputs from the data buffers 8, 18, pre-processing units 9, 19, and direction classification unit 11, and supplies an output to a post-processing unit 12 which in turn provides an output to one or other of two echo cancelling units 7, 17, which also receive an input from respective data buffers 8, 18. The echo cancellers 7, 17 provide an input to the paths 15, 5 respectively through respective combiners 13, 14 downstream of the tap points X, Y.

Figure 3:
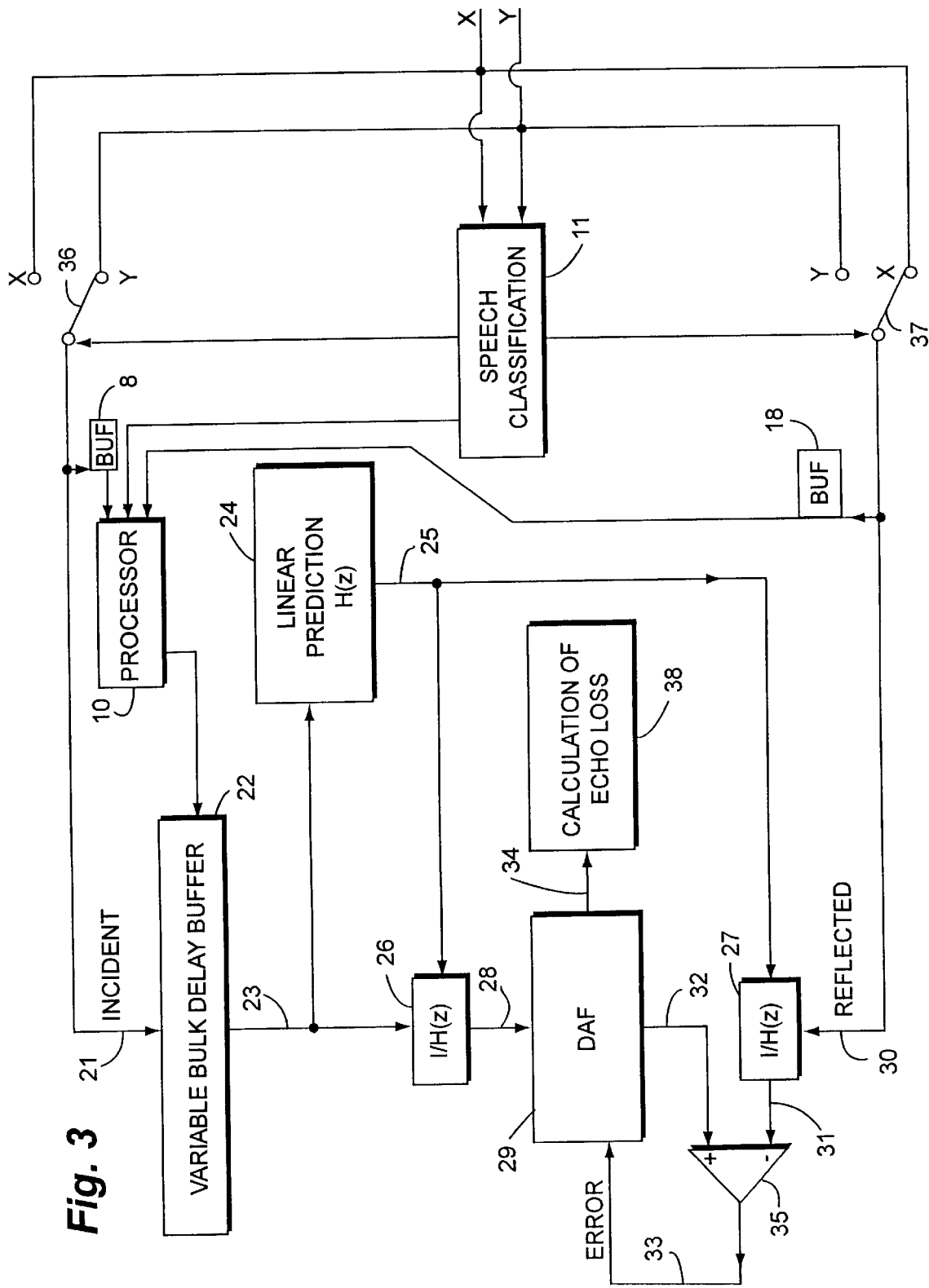
FIG. 3 shows a echo loss measurement system incorporating an echo detector according to the invention.

FIG. 3 illustrates an echo loss calculation device which can make use of the output of the device according to the invention.

Two signals X, Y are input to a speech classifier 11 which, as in FIG. 2, identifies which signal is the incident signal and which the reflected signal, and controls switches 36, 37 to feed the incident signal to an input 21 and the reflected signal to an input 30.

The incident and reflected signals are fed via buffers 8, 18 to a processor 10, as in FIG. 2, and the output of the processor 10 is fed to a bulk delay buffer 22.

The incident signal at input 21 is input to the buffer 22 to delay it for a period corresponding to the echo delay determined by the post-processor 12, generating a delayed input 23. Both signals are then fed to respective modifiers 26, 27 in which weightings are applied to generate a modified delayed input signal 28 and a modified reflected signal 31. The weightings are derived from an analysis unit 24 monitoring the delayed incident signal 23. The modified input signal 28 is then fed to a digital analogue filter (DAF) 29. The output 32 of the filter 29 is compared with the modified reflected signal 30 in a comparator 35 to generate an error signal 33 which is fed back to the DAF 29. The filter values of the DAF 29 can be read off at an output 34 to allow calculation of the echo loss by a calculator 38.

The operation of the invention will now be described. Referring now to FIG. 1, echo can be caused when part of a signal travelling along first path 5, destined for termination 2, is reflected at hybrid 4 and returned over second path 15. This signal will be heard by the user of termination 1, who was the original speaker of the utterance. Similarly, echo can be caused by hybrid 3, reflecting signals transmitted by termination 2 back to the speaker using that termination. Echo can also be caused by acoustical feedback at the remote end, between the user's earpiece and mouthpiece.

The delay between the outgoing and incoming signal as perceived by the user of a termination 1 is determined largely by the distance between the termination 1 and the hybrid 4 or other element which is causing the echo. Similarly, the delay between the outgoing and incoming signal as perceived by the user of a termination 2 is determined largely by the distance between the termination 2 and the hybrid 3 which is causing the echo.

The device 6 is connected to the network by tap connections X and Y connected to paths 5, 15 respectively and is used to detect the presence of echo in the system by monitoring both lines for signals, and cross-correlating these signals to identify characteristic signals having passed connection X and subsequently passing connection Y, or vice versa. Connections X and Y are simple low-impedance T-connections allowing the signals transmitted over the paths 5, 15 to be monitored by device 6. By measuring the delay between these events the distance of the source of echo can be derived: for example an echo generated by hybrid 4 produces a shorter echo delay than one from termination 2. Moreover, the path 5 or 15 on which the original signal appeared identifies the direction in which the echo is coming from, thereby establishing whether the source of echo is between device 6 and the first termination 1 or between the device 6 and the second termination 2.

In a real network there would be several elements such as hybrids 3, 4 on either side of the device 6, any of which might be the source of echo.

The echo detection device 6 uses a cross-correlation technique to compare speech on the reflected and transmitted paths. Cross-correlation is a method of statistical comparison of two signals generally used, in signal processing, to calculate the delay between the input waveform and the output waveform of a system.

In the present case the system in question is the echo path of the telephony circuit, i.e. from connection X to connection Y via hybrid 4, or from connection Y to connection X via hybrid 3.

The transmitted signal is compared with the reflected signal (normalised in amplitude to correspond to that of the transmitted signal) and a cross-correlation coefficient is calculated. The cross-correlation coefficient has a value from −1 to 1 and it describes how similar the two signals are. A value of 1 signifies a complete cross-correlation and results when the two waveforms are identical. A value of −1 signifies a complete negative match i.e. the signals are identical but for a 180° phase inversion. The human ear is not sensitive to phase, so for the present purpose a negative correlation is as important as a positive one, as the human ear will detect either as an echo. Consequently, the absolute magnitude of the correlation is used. The transmitted signal is then delayed by one unit of time and the cross-correlation coefficient is recalculated. A match between two signals (i.e. the magnitude of the cross-correlation coefficient being close to unity) will occur when the delayed transmit signal equals the reflected signal.

The echo detector pre-processes the speech signal before performing cross-correlation. This significantly improves the accuracy and reliability of the device by choosing segments that contain speech to cross-correlate with. In particular, because only selected segments are analysed, they can be analysed in more detail. For example the elemental delay imposed on the transmitted signal can proceed in smaller increments, improving the accuracy of the delay measurement.

To improve the accuracy and reliability of the system pre-processing of the signals is performed to identify speech segments that are suitable for cross-correlation. This pre-processing also identifies the direction of the talker's speech i.e. near-to-far or far-to-near. As speech is an essentially unidirectional means of communication (one person talks and the other listens) the monitor 6 measures both echo paths ('X to Y' via hybrid 4 and 'Y to X' via hybrid 3). To enable (almost) real-time measurements, parallel processing is used to divide the echo path into segments.

From the monitoring point X the original signal is passed to a data buffer 8 which stores the incoming signals for the length of time for which measurements may be made with them. The data entering the buffer is monitored by a speech pre-processing unit 9 which identifies segments suitable for measurement and indicates to a measurement unit 10 which such segments are present in the buffer 8. A second data buffer 18 and speech pre-processing unit 19 monitor the signals passing through monitoring point Y.

The outputs of speech pre-processing units 9, 19 are compared in a direction identification unit 11. This unit compares certain characteristics of the signal such as signal power and length of speech segment to determine which of the channels is carrying the original signal.

The measurement unit 10 uses the output of the direction indicating unit 11 and the speech pre-processing units 9, 19 to select data from buffers 8, 18 on which to carry out cross-correlation measurements. The results of these measurements are transmitted to a post-processing unit 12 which makes use of the cross-correlation results to take appropriate action.

The post-processing unit 12 may use the cross-correlation measurements to generate an echo cancellation signal. This is done in canceller 7 or 17 by extracting the input signal from buffer 8 or 18 respectively, attenuating and delaying it by amounts equivalent to the detected echo signal as measured in unit 12 and applying to the return path 15 or 5 respectively a signal corresponding to the result of this process but out of phase with the detected signal by 180°.

This applied signal is combined in combiners 13, 14 respectively with the echo arriving on the return path 5 or 15 to produce a zero output. It should be noted that the echo-cancellation signal should be applied downstream of the measurement points X, Y, to prevent the echo cancellation signal itself forming part of the signal measured on the return path.

The post-processing unit 12 may generate information for network management purposes. The length of delay can be used, in conjunction with knowledge of the call routing, to identify the component causing the echo, allowing remedial action to be taken. Alternatively, the call may be diverted to another route, or abandoned.

The required time to resolve a single echo and delay measurement is dependant on the maximum delay to be resolved i.e. for 1 second delay after a suitable speech segment is detected it takes 1 second to accumulate the samples and a further period to do the processing. By judicious programming it is possible to reduce the processing time further but ultimately the processing time is still dependant on the number of samples required to be stored for the echo path.

To decrease the processing time a means of setting the measurement range is included. Using this technique the algorithm can run simultaneously over several digital signalling processors (DSPs) within the measurement unit 10, with each DSP searching a different measurement range. For example four DSPs may be used to process delay measurements of 1 second. Each DSP searches a 250 range for the echo path (0–250, 250–500, 500–750, 750–1000), hence the limiting factor on the speech of the measurement is now only 250 ms. If the algorithm is used for national networks where the upper limit delay is likely not to exceed 60 ms the range can be reduced accordingly.

This configuration is very suitable for parallel processing enabling the correlation to spread over several processors—this improves the speed/efficiency of the algorithm.

A high level controller can determine which DSP returns the correct delay value by examination of the cross-correlation coefficient.

This technique of dynamically allocating the algorithm across the DSP resources increases the number of successful measurements in a given time period.

The buffers 8, 18 are used to store uncompressed samples from the 2 Mbit/s streams in the paths 5, 15. The buffers use a two pointer FIFO (first in first out) buffer, which has two flags FULL and EMPTY.

A conversation is constructed from speech spurts and pauses. Speech spurts give the best cross-correlation as the attenuation due to the echo path will diminish low energy segments, such as unvoiced and noise signals, the most. It is therefore important that the pre-processing selects segments that are likely to give a good cross-correlation. Pre-processing units 9, 19 select speech segments of the signals for cross-correlation.

A minimum segment length (40 ms) is required to give a reliable and accurate cross-correlation. The reliability improves further if a longer segment is used although the improvement is negligible above 80 ms. However if a segment is a fixed length i.e. 80 ms, it may contain only a short speech spurt at the beginning with the remainder of the segment being noise. If this occurs the segment is less likely to cross-correlate. A variable segment length ensures that the segment contains mainly speech, not noise. The pre-processing selects segments of speech between 40 and 80 ms in length.

As conversations are essentially uni-directional—people take turns to speak to each other—a direction indication unit 11 can be used to detect which party is talking. The echo path delay and loss is then calculated for that direction i.e. if speech is detected at point 'X' the echo path 'X-4-Y' is calculated; conversely if speech is detected at point 'Y' the echo path 'Y-3-X' is calculated. If speech is only present in one direction then it is not possible to resolve the echo path in the opposite direction.

The direction is found by comparing the length of the speech segments on the two channels. The channel with the longest segment of speech is taken as the channel with the incident speech.

A standard cross-correlation algorithm is used to calculate the delay.

If the Speech Echo Path Delay (SEPD) is resolved, the incident signal is given a delay, equal to the SEPD, and the echo signal loss is calculated from the difference between the root mean square (rms) of the incident signal and the rms of the reflected signal.

As mentioned above, speech needs to be present on a channel before a measurement can be resolved. The minimum measurement time is 15 seconds. This will increase the probability that a suitable segment of speech will be present on the channel. Within the 15 seconds it is likely that several measurements will be made—some means is required to choose the measurements that are correct. The method relies on two processes. Firstly cross-correlation produces a correlation coefficient value, or confidence factor. If the signals match exactly after the signals have been normalised and delayed suitably, an exact match produces a correlation coefficient of 1. Due to the impairments of the echo path it is likely that the correlation will be less than 1. Tests have shown that provided the correlation value is greater than 0.5 then the delay has been calculated correctly. Secondly if several results are produced it is reasonable to assume that each measurement is within an allowable accuracy of each other. A rolling average is used so that a value is included in the average if at least two results are within the allowed accuracy of each other. It is likely that any wrong cross-correlation will produce random delay estimates and hence will not be included in the average result.

In the embodiment described above cross-correlation is performed in the time domain. Alternatively, it could be performed in the frequency domain using fast Fourier transforms (FFT). This requires more memory but is more efficient.

One simple method for calculating cross-correlation is to only use the sign bit of the signal. If the samples from the original and reflected signals are of the same sign a counter is incremented, if they are of opposite sign the counter is decremented. For a good match a large total will be found, its magnitude being related to the length of the sample and its sign dependent on whether the echo is in-phase or antiphase. The output can be normalised using the length of the sample, giving values in the range −1 to +1. This method is not as accurate as other means of calculating the correlation coefficient but is reasonably accurate for low level of loss. It has the advantage of not being as computationally intensive and hence very quick. Such an arrangement is suitable for lower cost DSPs which have limited processing power and are designed to operate on circuits that will have a lower echo loss value.

The method is not limited to using speech as the circuit stimulus (it has however, been optimised for speech). Circuits that already have echo cancellers present will not, under normal operation, have an echo present. Although there is no echo present, round-trip delay is a useful measurement to obtain. For these circuits a continuity signal, generated by the signalling system can be used to perform the cross-correlation. A continuity signal is a tone, transmitted on the speech path from the outgoing switch to the incoming switch which loops the signal back. This method gives a measure of the delay between international switches. Continuity check tones are generated by the International Telecommunications Union (ITU-T) signalling system number 7 prior to a ringing tone.

The method of the invention can be applied to other applications not directly related to voice telephony, and in this specification the term 'telecommunications link' is used in the broad sense to cover any link carrying signals from one point to another, whether as part of a switched system or a dedicated link.

The interference detection system of the invention can be used for providing the echo delay input for an echo loss calculator as will now be described.

In FIG. 3 a delayed incident signal 28 and reflected signal 31 are input to a digital analogue filter 29. The output 32 of the DAF 29 is compared with a reflected signal 31 in a comparator 35 to generate an error signal 33 which is input to the DAF 29.

Using the unmodified incident speech 23 (delayed by the bulk delay 22) and reflected speech 30 as the inputs, the DAF 29 would converge to produce the impulse response of the echo path. The impulse response of the echo path is effectively a model of the echo path, however the model produced will not be exact as it is dependant on the characteristics of the speech. A DAF will converge to its optimum state if a white noise signal is used as its input. Therefore to improve the accuracy and the speed of convergence a linear prediction unit 24 is used to perform a form of pre-emphasis to modify the delayed incident signal 23 and reflected signal 30 to the DAF, to "whiten" the signals. The delayed incident signal 13 is modified in a filter 26 to generate a modified delayed incident signal 28. Similarly, the reflected signal 30 is modified in a filter 27 or generate a modified reflected signal 31. The modified signals 28, 31 are used as inputs to the DAF 29.

Speech signals consist of voiced and unvoiced segments. The voiced segments are high in energy and the samples are auto-correlated in contrast to the lower energy noise-like samples in the unvoiced segments. These characteristics result in a poor convergence rate of the LMS (least mean squares) algorithm used by the DAF. As the unvoiced segments are low in energy they tend to be corrupted by echo path noise, so the properties of the higher energy voiced segments have been exploited to improve the performance of the LMS algorithm. In order to do this the delayed incident signal is supplied to an LPC (linear predictive coding) analysis unit 24 which derives the coefficients of a filter H(z) having a frequency response similar to the frequency spectrum of the incident signal. Such analysis is well-known in the art. Essentially it generates a series of coefficients which, when applied to a white noise signal, reproduce the voiced sound that was modelled. In this way it simulates the effect of the vocal tract on the essentially white noise input to it by the speaker's lungs and windpipe. By applying the inverse function 1/H(z) of this in filters 26, 27 a pseudo-white noise signal corresponding in energy to the original speech can be generated.

The linear prediction unit 24 receives an input from the delayed incident speech signal 23. The sequence H(z) generated by the units 24 is transmitted as an output 25 to filters 26, 27 which apply the inverse of the sequence H(z) to the delayed incident signal 23, and the reflected signal 30, to generate modified outputs 28, 31 respectively.

The delay imposed by buffer 22 is determined by the correlation technique described above and this delay is applied to the signal 21 by means of the variable delay buffer 22, such that the DAF 29 is centred on the delay echo path. The DAF 29 will then converge on the echo path.

If the delay period is predetermined in this manner, the DAF 29 can be centred on the echo path, hence requiring the filter to have a much shorter length than if the delay imposed by buffer 22 were only an estimate.

It is desirable to test for echo on both channels of a two-way telecommunications link, as echo may appear on either, or both, channels. It is therefore necessary to identify on which channel the incident signal is to be found, so that the correct signal is delayed.

Instead of operating using a delay period variable between zero and a predetermined maximum, the period can instead be made variable between negative and positive values of the maximum.

However, since this would require both positive and negative values of delay to be tested for, it would halve the number of delay periods of different magnitude which can be tested for. Instead, in a preferred arrangement the channel currently carrying the incident signal is identified in a pre-characterising stage. In most cases a two-way voice link is used by the talkers in turn. It is therefore possible to identify which of the two channels is currently in use and monitor only the return channel for echoes. This can be done by identifying on which of the two channels the strongest signals are occurring. This channel is identified as the 'incident' channel and the other one is therefore the 'reflected' channel.

In the embodiment of FIG. 3 the speech classification is carried out by the voice activity detector 11. The detector 11 identifies on which of the two channels X, Y the strongest signals are to be found, and controls switches 36, 37. Switch 36 is arranged to provide either channel X or channel Y to the input 21, under the control of the detector 11. Similarly switch 37 is arranged to provide either channel X or channel Y to the input 30, also under the control of the detector 11. Detector 11 provides outputs such that when switch 36 is set to channel X, switch 37 is set to channel Y, and vice versa.

What is claimed is:

1. An interference detection system for a telecommunications link having separate first and second channels, the system comprising:

first monitoring means for monitoring signals travelling over the first channel, second monitoring means for monitoring signals travelling over the second channel;

comparison means for comparing the signals monitored by the first and second monitoring means for one or more delay periods to identify the presence of interference between the channels, the comparison means being arranged to identify cross-correlations between the signals monitored by the first and second monitoring means, the first monitoring means including means for detecting and selecting signal segments on the first channel having predetermined characteristics; and the comparison means being arranged to identify cross-correlations between such characteristic signal segments and the signals monitored by the second monitoring means, the selected signal segments having lengths corresponding to the duration of the predetermined characteristic.

2. A system as in claim 1 wherein:

the selection means is arranged to select parts of the signal having the detected predetermined characteristics having a duration greater than a predetermined minimum.

3. A system as in claim 1, wherein the comparison means comprises:

a plurality of cross-correlation means, each cross-correlation means performing a cross-correlation for a different delay period, and delay measurement means for determining, from the outputs of the cross-correlation means, the magnitude of the delay in the interference signal.

4. A system as in claim 3, including:

means for determining a rolling average from a predetermined number of measurements from the delay measurement means differing from each other by values less than a predetermined value.

5. A system as in claim 1, including a speech direction determination means comprising:

means for determining on which channel the longest segments of signal having the detected characteristics occur.

6. A system as in claim 1, in association with an echo loss calculation device, and further including:

means for generating an echo delay signal in response to the identification of a cross-correlation for a given delay period, and means for transmitting the echo delay signal to the echo loss calculation device.

7. A system as in claim 1, including:

means for introducing a cancellation signal into the second channel.

8. A network management system including:

at least one means for introducing a cancellation signal into a channel on which interference is detected, a plurality of interference detection systems according to claim 1 each associated with a respective pair of channels, and means for selecting the channel with which the cancellation means is associated in response to interference detected on the channel by the respective detection means.

9. A network management system including an interference detection system as in claim 1, comprising:

means for identifying, from the delay measured by the system, the network elements responsible for the interference.

10. A communications system having a plurality of communication channels, and an interference detection system according to claim 1, the first and second monitoring means of the interference detection system being arranged to monitor one or more pairs of the communication channels.

11. A communications system as in claim 10, wherein the pair or pairs of channels each comprise a two-way communications link, the system being arranged to detect echo.

12. A method of detecting interference between channels on a telecommunications link having first and second channels, the method comprising the steps of:

monitoring signals travelling over a first channel, monitoring signals travelling over a second channel, comparing the signals for one or more delay periods to identify the presence of interference between the channels, identifying cross-correlations between the signals carried by the first and second channels, detecting signals having predetermined characteristics on the first channel, selecting segments of signals having said characteristics, and identifying cross-correlations between such characteristic signal segments and the signals carried by the second channel, the selected signal segments having lengths corresponding to the duration of the predetermined characteristic.

13. A method as in claim 12, wherein the segments selected are of duration greater than a predetermined minimum.

14. A method as in claim 12, wherein the cross-correlations are performed for a plurality of delay periods to determine the magnitude of the delay.

15. A method as in claim 14, wherein:

a rolling average of the determined delay is recorded, the average being calculated from a predetermined number of delay measurements differing from each other by less than a predetermined value.

16. A method as in claim 12, wherein:

the channel to be monitored for the initial speech signal is identified by monitoring both channels for signals having the predetermined characteristics and determining on which channel the longest segments having the predetermined characteristics occur.

17. A method of measuring echo path loss, in which echo delay is determined as in the method of claim 12.

18. A method of interference-cancellation comprising detecting interference by the method of claim 12, further comprising:

adding to the second channel a signal complementary to the signal detected on the first channel and having the same delay and attenuation as the interference signal detected.

19. A method of interference cancellation in a telecommunications system comprising a plurality of channel pairs, said method comprising:

monitoring each channel pair for interference by the method of claim 12, selecting at least one channel pair having the strongest interference signals, and applying to the second channel of the at least one pair a signal complementary to the signal detected on the first channel and having the same delay and attenuation as the interference signal detected.

20. A method of monitoring a telecommunications network comprising:

detecting the presence of interference by a method according to claim 12, and determining, from the delay so measured, the location of the element of the network responsible for causing the interference.

21. A method as in claim 12 in which:

the two channels form a two-way communications link, the method being such that the interference detected on the second channel is an echo of the signal on the first channel.

* * * * *